US009836827B2

(12) United States Patent
Putraya et al.

(10) Patent No.: US 9,836,827 B2
(45) Date of Patent: Dec. 5, 2017

(54) METHOD, APPARATUS AND COMPUTER PROGRAM PRODUCT FOR REDUCING CHROMATIC ABERRATIONS IN DECONVOLVED IMAGES

(71) Applicant: Nokia Technologies Oy, Espoo (FI)

(72) Inventors: Gururaj Putraya, Bangalore (IN); Krishna Annasagar Govindarao, Bangalore (IN); Mithun Uliyar, Bangalore (IN); Basavaraja S V, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/051,616

(22) Filed: Feb. 23, 2016

(65) Prior Publication Data

US 2016/0253790 A1    Sep. 1, 2016

(30) Foreign Application Priority Data

Feb. 26, 2015 (IN) .............................. 929/CHE/2015

(51) Int. Cl.
*G06T 5/00* (2006.01)
*G06K 9/40* (2006.01)
(Continued)

(52) U.S. Cl.
CPC .............. *G06T 5/003* (2013.01); *G06T 5/006* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS 8,150,154 B2    4/2012   Kang et al.
8,237,823 B2    8/2012   Kang et al.
(Continued)

FOREIGN PATENT DOCUMENTS

CN      102868891 A     1/2013
JP      H06-339146 A    12/1994
(Continued)

OTHER PUBLICATIONS

Heide et al., "High-Quality Computational Imaging Through Simple Lenses", ACM Transactions on Graphics, vol. 32, No. 5, Sep. 2013, pp. 1-14.
(Continued)

*Primary Examiner* — Brian P Werner
(74) *Attorney, Agent, or Firm* — Nokia Technologies Oy

(57) ABSTRACT

In an example embodiment, method, apparatus and computer program product are provided. The method includes facilitating receipt of a deconvolved image including a plurality of component images. A guide image is selected from the component images and a cross-filtering is performed of component images other than the guide image to generate filtered component images. The cross-filtering is performed of a component image by iteratively performing, selecting a pixel and a set of neighboring pixels around the pixel in the guide image, computing a set of weights corresponding to the set of neighboring pixels based at least on spatial differences between the pixel and the set of neighboring pixels, and cross-filtering a corresponding pixel of the pixel in the component image based on the set of weights to generate a filtered corresponding pixel in the component image. The filtered component images form a filtered deconvolved image with reduced chromatic aberration.

18 Claims, 7 Drawing Sheets

(51) Int. Cl.
*G06T 5/20* (2006.01)
*G06T 5/50* (2006.01)

(52) U.S. Cl.
CPC .............. *G06T 2207/10024* (2013.01); *G06T 2207/20024* (2013.01); *G06T 2207/20028* (2013.01); *G06T 2207/20201* (2013.01)

(56) References Cited

U.S. PATENT DOCUMENTS

2009/0046944 A1* 2/2009 Bilcu .................... H04N 9/045
382/274
2009/0285480 A1 11/2009 Bennett et al.

FOREIGN PATENT DOCUMENTS

JP 2011-211669 A 10/2011
WO 2014/048451 A1 4/2014

OTHER PUBLICATIONS

Levin et al., "Efficient Marginal Likelihood Optimization In Blind Deconvolution", IEEE Conference on Computer Vision and Pattern Recognition, Jun. 20-25, 2011, pp. 2657-2664.

Hirsch et al., "Efficient Filter Flow for Space-Variant Multiframe Blind Deconvolution", IEEE Conference on Computer Vision and Pattern Recognition, Jun. 13-18, 2010, pp. 607-614.

Joshi et al., "PSF Estimation Using Sharp Edge Prediction", Computer Vision and Pattern Recognition, 2008, 8 pages.

Chung et al., "Detecting and Eliminating Chromatic Aberration in Digital Images", 16th IEEE International Conference on Image Processing, 2009, 4 pages.

Extended European Search Report received for corresponding European Patent Application No. 16157252.4, dated Jul. 8, 2016, 6 pages.

Wada et al., "Extended Joint Bilateral Filter for the Reduction of Color Bleeding in Compressed Image and Video", ITE transactions on media technology and applications, vol. 3, No. 1, 2015, pp. 95-106.

He et al., "Blind Color Image Deconvolution Based on Wavelet Decomposition", IEEE International Conference on Image Processing, Sep. 11, 2005, 4 pages.

Stawiaski et al., "Minimum Spanning Tree Adaptive Image Filtering", Proceedings of the 16th IEEE International Conference on Image Processing, 2009, pp. 2245-2248.

Office action received for corresponding Japanese Patent Application No. 2016-029425, dated Feb. 3, 2017, 6 pages of office action and 6 pages of office action translation available.

Ueda et al., "A Proposal of Colorization Method for Monochrome Image by Using Color Selection Based on Vector Median", The Institute of Electronics Information and Communication Engineers Technical Report, Sep. 2013, 5 pages.

Wada et al., "Extended Joint Bilateral Filtering for Color Quality Enhancement", The Institute of Electronics Information and Communication Engineers Technical Report, vol. 38, No. 7, Feb. 2014, 14 pages.

Koga et al., "Image Enhancement by Using Edge-preserving Smoothing based on SFC-MST", The Institute of Electronics Information and Communication Engineers, Technical Report, vol. 111, No. 342, Dec. 15-16, 2011, 8 pages.

* cited by examiner

METHOD, APPARATUS AND COMPUTER PROGRAM PRODUCT FOR REDUCING CHROMATIC ABERRATIONS IN DECONVOLVED IMAGES

TECHNICAL FIELD

Various implementations relate generally to method, apparatus, and computer program product for reducing chromatic aberrations in deconvolved images.

BACKGROUND

Various electronic devices, for example, mobile phones, and other multimedia devices are widely used for capturing images. Most images that are captured are blurred images or out-of-focus images due to handshake or other reasons. Efforts have been made for restoring such blurred images. One example method used for removing blur from the blurred images is image deconvolution based on a point spread function. Though a deconvolved image obtained by performing the image deconvolution on the blurred image is sharper and in focus, the deconvolved image is fraught with chromatic aberrations. Existing methods to reduce such chromatic aberrations from the deconvolved image is inefficient and complex, and a user still wants to experience higher quality and focused images.

SUMMARY OF SOME EMBODIMENTS

Various aspects of example embodiments are set out in the claims.

In one embodiment, there is provided a method comprising: facilitating receipt of a deconvolved image, the deconvolved image comprising a plurality of component images corresponding to a plurality of image channels; selecting a guide image from among the plurality of component images; and performing a cross-filtering of one or more component images that are other than the guide image in the plurality of component images to generate one or more filtered component images, wherein performing a cross-filtering of a component image of the one or more component images comprises iteratively performing: selecting a pixel and a set of neighboring pixels around the pixel in the guide image; computing a set of weights corresponding to the set of neighboring pixels based at least on spatial differences between the pixel and the set of neighboring pixels; and filtering a corresponding pixel of the pixel in the component image based on the set of weights to generate a filtered corresponding pixel in the component image, wherein the one or more filtered component images form a filtered deconvolved image with reduced chromatic aberration.

In another embodiment, there is provided an apparatus comprising at least one processor; and at least one memory comprising computer program code, the at least one memory and the computer program code configured to, with the at least one processor, cause the apparatus to at least perform: facilitate receipt of a deconvolved image, the deconvolved image comprising a plurality of component images corresponding to a plurality of image channels; select a guide image from among the plurality of component images; and perform a cross-filtering of one or more component images that are other than the guide image in the plurality of component images to generate one or more filtered component images, wherein performing a cross-filtering of a component image of the one or more component images comprises iteratively performing: select a pixel and a set of neighboring pixels around the pixel in the guide image; compute a set of weights corresponding to the set of neighboring pixels based at least on spatial differences between the pixel and the set of neighboring pixels; and filter a corresponding pixel of the pixel in the component image based on the set of weights to generate a filtered corresponding pixel in the component image, wherein the one or more filtered component images form a filtered deconvolved image with reduced chromatic aberration.

In another embodiment, there is provided a computer program product comprising at least one computer-readable storage medium, the computer-readable storage medium comprising a set of instructions, which, when executed by one or more processors, cause an apparatus to at least perform: facilitate receipt of a deconvolved image, the deconvolved image comprising a plurality of component images corresponding to a plurality of image channels; select a guide image from among the plurality of component images; and perform a cross-filtering of one or more component images that are other than the guide image in the plurality of component images to generate one or more filtered component images, wherein performing a cross-filtering of a component image of the one or more component images comprises iteratively performing: select a pixel and a set of neighboring pixels around the pixel in the guide image; compute a set of weights corresponding to the set of neighboring pixels based at least on spatial differences between the pixel and the set of neighboring pixels; and filter a corresponding pixel of the pixel in the component image based on the set of weights to generate a filtered corresponding pixel in the component image, wherein the one or more filtered component images form a filtered deconvolved image with reduced chromatic aberration.

In another embodiment, there is provided an apparatus comprising: means for facilitating receipt of a deconvolved image, the deconvolved image comprising a plurality of component images corresponding to a plurality of image channels; means for selecting a guide image from among the plurality of component images; and means for performing a cross-filtering of one or more component images that are other than the guide image in the plurality of component images to generate one or more filtered component images, wherein means for performing a cross-filtering of a component image of the one or more component images comprises iteratively performing: means for selecting a pixel and a set of neighboring pixels around the pixel in the guide image; means for computing a set of weights corresponding to the set of neighboring pixels based at least on spatial differences between the pixel and the set of neighboring pixels; and means for filtering a corresponding pixel of the pixel in the component image based on the set of weights to generate a filtered corresponding pixel in the component image, wherein the one or more filtered component images form a filtered deconvolved image with reduced chromatic aberration.

In another embodiment, there is provided a computer program comprising program instructions which when executed by an apparatus, cause the apparatus to: facilitate receipt of a deconvolved image, the deconvolved image comprising a plurality of component images corresponding to a plurality of image channels; select a guide image from among the plurality of component images; and perform a cross-filtering of one or more component images that are other than the guide image in the plurality of component images to generate one or more filtered component images, wherein performing a cross-filtering of a component image of the one or more component images comprises iteratively performing: selecting a pixel and a set of neighboring pixels around the pixel in the guide image; computing a set of weights corresponding to the set of neighboring pixels based at least on spatial differences between the pixel and the set of neighboring pixels; and filtering a corresponding pixel of the pixel in the component image based on the set of weights to generate a filtered corresponding pixel in the component image, wherein the one or more filtered component images form a filtered deconvolved image with reduced chromatic aberration.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 9 of the drawings.

Figure 1:
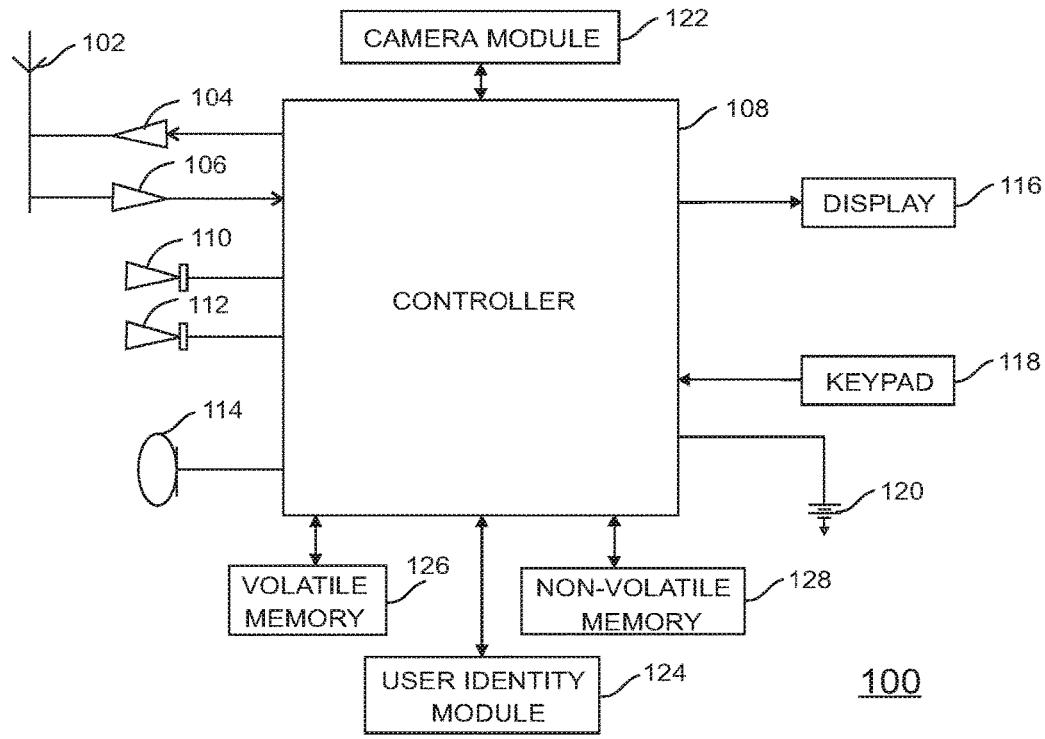
FIG. 1 illustrates a device, in accordance with an example embodiment.

FIG. 1 illustrates a device 100, in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of touch screen based mobile electronic devices, for example, portable digital assistants (PDAs), mobile televisions, gaming devices, cellular phones, all types of computers (for example, laptops, mobile computers or desktops), cameras, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and the receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area networks, wide area networks, and the like; short range wireless communication networks such as include Bluetooth® networks, Zigbee® networks, Institute of Electric and Electronic Engineers (IEEE) 802.11x networks, and the like; wireline telecommunication network such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional web browser. The connectivity program may then allow the device 100 to transmit and receive web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
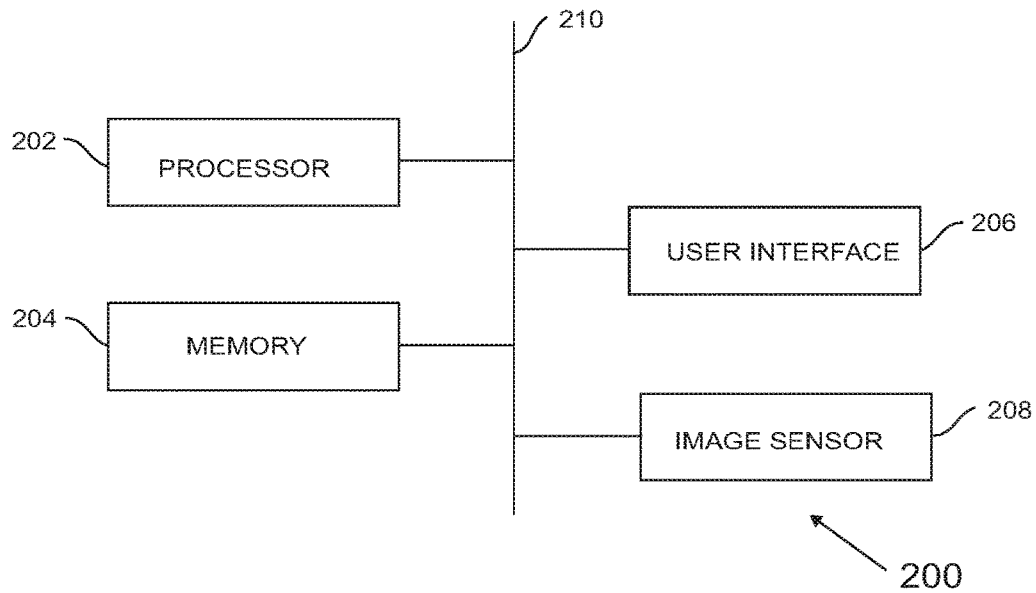
FIG. 2 illustrates an apparatus configured for reducing chromatic aberrations in deconvolved images, in accordance with an example embodiment.

FIG. 2 illustrates an apparatus 200 configured for reducing chromatic aberrations in deconvolved images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output interface provides an audible, visual, mechanical or other output and/or feedback to the user. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, multimedia playback device, media capturing device with or without communication capabilities, computing devices, and the like. Some examples of the electronic device may include a mobile phone, audio/video player, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and the display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of the media content may include audio content, video content, data, and a combination thereof.

In an example embodiment, the electronic device may be optionally embodied as to include one or more image sensors, for example an image sensor 208, embodied in one or more camera modules. Though only one image sensor 208 is shown in the example representation of FIG. 2, but the electronic device may include more such image sensors. The image sensor 208 may be in communication with the processor 202 and/or other components of the apparatus 200. The image sensor 208 may be in communication with other imaging circuitries and/or software, and are configured to capture digital images or to capture video or other graphic media. The image sensor 208 and other circuitries, in combination, may be example of at least one camera module such as the camera module 122 of the device 100.

These components (202-208) may communicate to each other via a centralized circuit system 210 to facilitate improvement of image and video captures in the apparatus 200. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the apparatus 200 is caused to reduce chromatic aberrations in image deconvolution. In this example embodiment, the processor 202 is configured to, with the content of the memory 204, and optionally with other components described herein, to cause the apparatus 200 to facilitate receipt of a deconvolved image. In an example embodiment, the apparatus 200 may directly receive the deconvolved image, or may receive an image and perform image deconvolution of the image to generate the deconvolved image. For instance, the apparatus 200 may capture or receive the image, and perform the image deconvolution. Herein, the 'image deconvolution' refers to a method used to remove blur from blurred or out-of-focus images, caused due to handshake, improper focus or any other phenomena. For instance, the image deconvolution may be performed based on a point spread function (PSF) known in the art. Herein, the 'image' represents a capture of a scene, and 'scene' refers to an arrangement (natural, manmade, sorted or assorted) of one or more objects of which images and/or videos can be captured. In an example, the image may be captured by one or more image sensors, for example by the image sensor 208. In an example embodiment, the image and/or the deconvolved image may be stored in the memory 204 or any other storage location accessible to the apparatus 200. In an example embodiment, a processing means may be configured to facilitate receipt of a deconvolved image. An example of the processing means may include the processor 202, which may be an example of the controller 108.

In an example embodiment, the deconvolved image that is received includes a plurality of component images that may be a plurality of image channels associated with the deconvolved image. For instance, in an example, the plurality of component images may include a luminance image (Y), a chrominance blue image (Cb), and a chrominance red image (Cr) (hereinafter collectively referred to as 'YCbCr component images') associated with YCbCr image channels. In another example, the plurality of component images may include a luminance image (Y), a first color difference image (Pb), and a second color difference image (Pr) (hereinafter collectively referred to as 'YPbPr component images') associated with YPbPr image channels. In another non-limiting example, the plurality of component images may include a red image (R), a green image (G), and a blue image (B) (hereinafter collectively referred to as 'RGB component images') associated with RGB image channels.

In an example embodiment, if an input deconvolved image includes the R, G, and B component images, the R, G, and B component images may be converted to the YCbCr component images of the deconvolved image. The present disclosure is explained with the example of the deconvolved image including the YCbCr component images. However, it should be noted that the deconvolved image may include other types of component images, and therefore, embodiments should not be limited to the YCbCr component images.

In some example embodiments, the processor 202 is configured to select a guide image from among the plurality of component images. In an example embodiment, the present disclosure uses cross-filtering to reduce the chromatic aberrations of the deconvolved image. Herein, the 'cross-filtering' refers to a process of filtering other component images as per the guide image. The guide image is hence selected from the plurality of component images in order to guide the processor 202 along with other components to filter the other component images of the plurality of images. For instance, in an example embodiment, the guide image is used to align edges of the other component images with that of the guide image. In an example embodiment, the Y component image is selected as the guide image from the YCbCr component images. Similarly, if the deconvolved image includes the YPbPr component images, the Y component image is selected as the guide image from the YPbPr component images, and if the deconvolved image includes the RGB component images, the G component image is selected as the guide image from the RGB component images. In an example embodiment, a processing means may be configured to select the guide image from among the plurality of component images. An example of the processing means may include the processor 202, which may be an example of the controller 108.

In some example embodiments, the processor 202 is configured to perform a cross-filtering of one or more component images that are other than the guide image in the plurality of component images to generate one or more filtered component images. In an example embodiment, the cross-filtering is performed based on a bilateral filtering method and/or a minimum spanning tree method. In an example embodiment, the cross-filtering is performed on the component images that are other than the Y component image (the guide image), for example the Cb and Cr component images.

In an example embodiment, the cross-filtering is performed on a component image of the one or more component images by iteratively performing selection of a pixel and a set of neighboring pixels around the pixel in the guide image, computation of a set of weights corresponding to the set of neighboring pixels based at least on spatial and pixel differences between the selected pixel and the set of neighboring pixels, and filtration of a corresponding pixel of the selected pixel in the component image based on the set of weights to generate a filtered corresponding pixel in the component image, and which are subsequently described further in detail. In an example embodiment, a processing means may be configured to perform the cross-filtering of the one or more component images. An example of the processing means may include the processor 202, which may be an example of the controller 108.

In the example embodiment of performing the cross-filtering of the component image in each iteration, the apparatus 200 is caused to select a pixel and a set of neighboring pixels around the pixel in the guide image. In an example embodiment, the pixel and the set of neighboring pixels represent a window of pixels of size W (width)×W (height). For instance, if the cross-filtering is performed on the Cb component image with respect to the Y component image (the guide image), a pixel (Pi, where i includes all pixels of the Y component image in sequential iterations) and the set of neighboring pixels around the pixel (Pi) are selected in the Y component image. The pixel (Pi) and the set of neighboring pixels together form the window of pixels W×W. In an example embodiment, the window of pixels is centered around the pixel (Pi) in the guide image. For example, a 3×3 window of pixels includes pixels 1, 2, 3 in a first row, pixels 4, 5, 6 in a second row, and pixels 7, 8, 9 in a third row. The 3×3 window of pixels is hence centered around the pixel 5 and the set of neighboring pixels around the pixel 5 include the pixels 1, 2, 3, 4, 6, 7, 8, and 9. However, if the pixel is a corner pixel or any boundary pixel in the Y component image, the set of neighboring pixels are limited in number (for example, less than eight) and only such neighboring pixels are considered for the cross-filtering. In an example embodiment, a processing means may be configured to select the pixel and the set of neighboring pixels. An example of the processing means may include the processor 202, which may be an example of the controller 108.

In this example embodiment of performing the cross-filtering of a component image, the apparatus 200 is caused to compute a set of weights corresponding to the set of neighboring pixels based at least on spatial differences and pixel differences between the selected pixel and the set of neighboring pixels. In an example embodiment, the set of weights may be computed only based on the spatial differences between the selected pixel and the set of neighboring pixels, and may not utilize the computation of the pixel differences between the selected pixel and the set of neighboring pixels. In an example embodiment, a weight is computed for each neighboring pixel in the set of neighboring pixels so as to compute the set of weights for the set of neighboring pixels. For example, the 3×3 window of pixels that include the neighboring pixels 1 to 4 and 6 to 9 around the pixel 5 have corresponding weights W1 to W4 and W6 to W9. In an example embodiment, the set of weights are computed based on a set of spatial differences as well as on a set of pixel differences between the pixel (for example, pixel 5) and the set of neighboring pixels, which are described later in detail. In an example embodiment, a processing means may be configured to compute the set of weights corresponding to the set of neighboring pixels. An example of the processing means may include the processor 202, which may be an example of the controller 108.

In an example embodiment of computing the set of weights corresponding to the set of neighboring pixels, the apparatus 200 is caused to calculate the set of spatial differences and pixel differences between the selected pixel and the set of neighboring pixels. In an example embodiment, a spatial difference is calculated for each neighboring pixel with respect to the selected pixel. Herein, the 'spatial difference' refers to a spatial distance between the selected pixel and the neighboring pixel. In an example embodiment, the apparatus 200 is caused to calculate the spatial difference between a pixel (i, j) and a neighboring pixel (k, l) of the set of neighboring pixels based on the following expression (1):

spatial difference$(k,l)$=exp$\{-[(k-i)^2+(l-j)^2]/(2*$sigma_domain$^2)\}$ where (i, j) are pixel coordinates of the pixel, where (k, l) are pixel coordinates of any neighboring pixel of the set of neighboring pixels with respect to the pixel (i, j), and each of k, l varies within a range between $-(W-1)/2$ to $(W-1)/2$, in which W is a width of a window of pixels W×W (where W is an odd integral number), and where sigma_domain is a pre-fixed constant.

In this example embodiment of computing the set of weights corresponding to the set of neighboring pixels, the apparatus 200 is caused to calculate a set of pixel differences between the selected pixel and the set of neighboring pixels. In an example embodiment, a pixel difference is calculated for each neighboring pixel with respect to the selected pixel. Herein, the 'pixel difference' refers to a difference in intensities or pixel values between the selected pixel and the neighboring pixel. In an example embodiment, the apparatus 200 is caused to calculate the pixel difference between the selected pixel and the neighboring pixel of the set of neighboring pixels based on the following expression (2):

pixel difference$(k,l)$=exp$\{-[g(i-k,j-l)-g(i,j)]^2/(2*$sigma_range$^2)\}$ where $g(i-k, j-l)$ is a pixel value in the guide image at a pixel location $(i-k, j-l)$, and where sigma_range is a pre-fixed constant, and where (k, l) are pixel coordinates of the neighboring pixel of the set of neighboring pixels and each of k and l ranges between $-(W-1)/2$ to $(W-1)/2$ in which W is width of a window of pixels W×W.

In this example embodiment of computing the set of weights corresponding to the set of neighboring pixels, the apparatus 200 is caused to compute the set of weights based on functions of the set of spatial differences and the set of pixel differences. In an example embodiment, the apparatus 200 is caused to compute the weight for a neighboring pixel (of the set of neighboring pixels) based on a multiplication function of the spatial difference and the pixel difference determined for the neighboring pixel as per the following expression (3):

Weight$(k,l)$=spatial difference$(k,l)$*pixel difference$(k,l)$ where (k, l) are pixel coordinates of the neighboring pixel of the set of neighboring pixels and each of k and l ranges between $-(W-1)/2$ to $(W-1)/2$, in which W is a width of a window of pixels W×W.

It should be noted that the weight (k, l) is calculated for all neighboring pixels around the pixel (i, j). Further in an example embodiment, all pixels of the guide image (by varying 'i' and 'j' to select all pixels sequentially or simultaneously) are selected, and the set of weights for the set of neighboring pixels for all pixel (i, j) are calculated.

In an example embodiment of performing the cross-filtering of a component image, the apparatus 200 is caused to filter a corresponding pixel of the pixel (i, j) in the component image based on the set of weights to generate a filtered corresponding pixel in the component image. For instance, the pixel (i, j) in the Y component image (the guide image) has a corresponding pixel (i', j') in the Cb component image and a corresponding pixel (i", j") in the Cr component image. Hence, the corresponding pixel (i', j') and the corresponding pixel (i", j") are filtered based on the set of weights W1-W4 and W6-W9 to generate the filtered corresponding pixels of pixel (i', j') and pixel (i", j"). In an example embodiment, the apparatus 200 is caused to generate the filtered corresponding pixel of the pixel (i, j) in the component image based on the following expression (4):

$$\text{filtered corresponding pixel}(i, j) = \frac{\left(\sum [g'(i-k, j-l) * \text{weight}(k, l)]\right)}{\left(\sum [\text{weight}(k, l)]\right)}$$

where g' (i–k, j–l) is a pixel value of a corresponding neighboring pixel of the corresponding pixel in the component image.

In an example embodiment, the cross-filtering performed above is referred to as the bilateral filtering method and the weight(k, l) is a bilateral weight. In an example embodiment, the cross-filtering may also be performed using the minimum spanning tree method. In the minimum spanning tree method, the window of pixels W×W may span the Y component image (the guide image) either completely or in part. In this example embodiment, the set of weights include minimum spanning tree weights calculated corresponding to neighboring pixels (k, l) and filtered corresponding pixels in the component image are obtained based on the set of weights. In an embodiment of the minimum spanning tree method, there is no such window (W×W) of pixels around the selected pixel, and the set of neighboring pixels can include all pixels or any combination of pixels of the guide image. In this example embodiment, effects (termed as 'weights') of other pixels of the guide image on the selected pixel are calculated, and the calculated weights are used to filter the corresponding pixel of the selected pixel in the component image. Hence, the term 'neighboring pixel' in this example embodiment of minimum spanning tree method does not necessarily represent a pixel adjoining to the selected pixel or located within a particular spatial distance from the selected pixel; in fact the 'neighboring pixel' herein can represent any pixel in the guide image and is irrespective of any spatial distance from the selected pixel.

In an example embodiment, the apparatus 200 is caused to calculate the minimum spanning tree weight of the set of weights for a neighboring pixel of the set of neighboring pixels based on the following expression (5):

$$\text{weight}(k, l) = \exp\left\{-\frac{D[\text{pixel at location}(k, l), \text{pixel at location}(i, j)]}{\text{sigma}}\right\}$$

where (k, l) are pixel coordinates of a pixel in the guide image, weight(k, l) determines the contribution of pixel (k, l) on the filtered value at pixel co-ordinate (i, j), where D [pixel at location (k, l), pixel at location (i, j)] is a minimum spanning tree distance between the neighboring pixel at location (k, l) and the selected pixel at location (i, j), and where sigma is a pre-fixed constant.

In an example embodiment, the apparatus 200 is caused to generate the filtered corresponding pixel of the pixel (i, j) in the component image based on the following expression (6):

$$\text{filtered corresponding pixel}(i, j) = \frac{\left(\sum [g'(i-k, j-l) * \text{weight}(k, l)]\right)}{\left(\sum [\text{weight}(k, l)]\right)}$$

where g' (i–k, j–l) is a pixel value of a corresponding neighboring pixel of the corresponding pixel in the component image and where the weight(k, l) is the minimum spanning tree weight.

In an example embodiment, based on the above cross-filtering (either by the bilateral filtering method or by the minimum spanning tree method), the deconvolved image that is obtained is a filtered deconvolved image having reduced chromatic aberrations. In an example embodiment, after the cross-filtering is performed, the filtered deconvolved image including the Y, Cb and Cr component images may be retained as such, or converted to a deconvolved image including the R, G, B component images.

Various suitable techniques may be used to reduce the chromatic aberrations in deconvolved images by the apparatus 200. Some example embodiments of reducing the chromatic aberrations in deconvolved images are explained in the following description; however, these example embodiments should not be considered as limiting to the scope of the present technology.

An example of performing the cross-filtering based on the bilateral filtering method is described with reference to FIG. 3.

Figure 3:
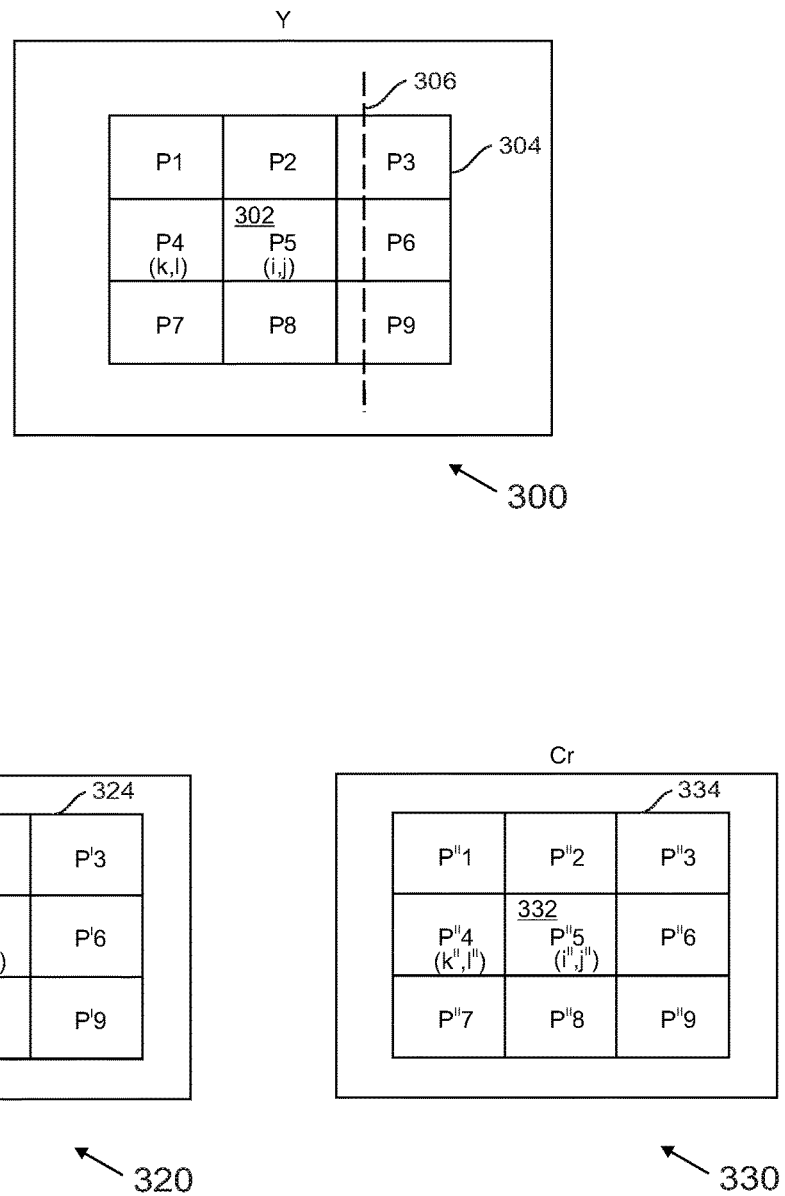
FIG. 3 illustrates an example representation for reducing chromatic aberrations in a deconvolved image, in accordance with an example embodiment.

FIG. 3 illustrates example representations for reducing chromatic aberrations in a deconvolved image, in accordance with an example embodiment. The example representations include a Y component image 300, a Cb component image 320, and a Cr component image 330 that correspond to the plurality of component images of the deconvolved image. It should be noted that the Y component image 300, the Cb component image 320, and the Cr component image 330 of the deconvolved image are shown for representation purposes only to facilitate description of some example embodiments; and such representations does not necessarily represent actual component images.

The bilateral filtering method is applied for performing cross-filtering of the Cb and Cr component images 320 and 330, respectively. In an example embodiment, the Y component image 300 is selected as a guide image from the Y, Cb, Cr component images (300-330). An example of a pixel such as a pixel 302 and a set of neighboring pixels around the pixel 302 are shown in the Y component image 300. The pixel 302 and the set of neighboring pixels are represented by a window of pixels 304. In this example, the window of pixels 304 has W×W of 3×3, for example, the width and height of the window of pixels 304 are 3. Neighboring pixels in the set of neighboring pixels are represented as P1, P2, P3, P4, P6, P7, P8 and P9, and the pixel 302 is also represented as P5. Each pixel is identified by (x, y) pixel coordinates, for example the pixel P5 is represented by pixel coordinates (i, j) and each neighboring pixel may be represented by pixel coordinates (k, l) with respect to the pixel coordinates (i, j). In an example embodiment, if the pixel 302 is a corner or a boundary pixel, the number of pixels in set of neighboring pixels may be less, and only such neighboring pixels are considered for the cross-filtering.

In an example, weights (bilateral weights) of each neighboring pixel P1-P4 and P6-P9 are determined as W1-W4 and W6-W9, respectively. For example, weight of the neighboring pixel P4 (k, l) may be determined as following. A spatial difference (k, l) between the pixel P5 (i, j) and the neighboring pixel P4 (k, l) is calculated using the expression (1) as described with reference to FIG. 2. A pixel difference (k, l) between the pixel P5 (i, j) and the neighboring pixel P4 (k, l) is further calculated as per the expression (2) as described with reference to FIG. 2. The weight (k, l) corresponding to the neighboring pixel P4 (k, l) is computed based on a multiplication function of the spatial difference (k, l) and the pixel difference (k, l), as per the expression (3) as described with reference to FIG. 2.

In an embodiment, weights corresponding to the neighboring pixels may be different in values. For example, if the pixel P5 (i, j) represents a red color, and the neighboring pixels P1 and P6 represent red color and blue color, respectively, the weight of the neighboring pixel P1 is higher than the weight of the neighboring pixel P6, as the neighboring pixel P1 is similar and/or closer to the pixel P5 in color (red color). Moreover, the weights corresponding to the neighboring pixels may also differ if there is an edge in the guide image. For instance, an edge 306 shown in the window 304 may cause pixels present on one side of the edge to have different weights as compared to pixels present on the other side due to difference in pixel values. Color difference, for example, of the neighboring pixels P3, P6 and P9 may represent a section present right of the edge 306 that may be of a different color or different portion of the Y component image 300, as compared to a section present left of the edge 306. For instance, weights of the neighboring pixels P3, P6 and P9 (that are present on opposite side of the edge 306 from the pixel P5) may be smaller as compared to weights corresponding to the neighboring pixels P1, P2, P4, P7 and P8 (that are present on the side of the pixel P5 from the edge 306).

The weights corresponding to the set of neighboring pixels are determined in a similar manner for each pixel of the guide image. In an example embodiment, as the weights corresponding to the set of neighboring pixels are determined for all pixels of the guide image, the cross-filtering of corresponding pixels of other component images (for example, Cb component image 320 and Cr component image 330) are performed with respect to the guide image. For example, a pixel corresponding to the pixel 302 in the Cb component image 320 is shown as a pixel 322, and a corresponding set of neighboring pixels around the pixel 322 are also considered in the Cb component image 320. The pixel 322 and the set of neighboring pixels of the pixel 322 are represented by a window of pixels 324. In this example, the window of pixels 324 has W×W of 3×3, for example, the width and height of the window of pixels 324 are 3. In the Cb component image 320, each corresponding pixel in the window of pixels 324 is represented by (x', y') pixel coordinates, for example a corresponding pixel P'5 is represented by pixel coordinates (i', j') and each corresponding neighboring pixel may be represented by pixel coordinates (k', l'). The corresponding pixel 322 of the pixel 302 is filtered based on the set of weights (W1-W4 and W6-W9) to generate a filtered corresponding pixel 322 of the Cb component image 320. For instance, the pixel 322 is filtered by using the weights (W1-W4 and W6-W9) calculated for the set of neighboring pixels in the guide image (Y component image 300) as per the expression (4) as described with reference to FIG. 3. Accordingly, each corresponding pixel in the Cb component image 320 is filtered in the above described manner to obtain a filtered Cb component image with reduced chromatic aberrations.

The cross-filtering is also performed on the Cr component image 330. For example, a corresponding pixel 332 of the pixel 302 and a corresponding set of pixels of the set of pixels is considered in the Cr component image 330. The pixel 332 and the set of neighboring pixels are represented by a window of pixels 334. In this example, the window of pixels 334 has W×W of 3×3, for example, the width and height of the window of pixels 334 are 3. In the Cr component image 330, a corresponding pixel P'''5 in the window of pixels 334 is represented by pixel coordinates (i'', j'') and each corresponding neighboring pixel may be represented by pixel coordinates (k'', l''). The corresponding pixel 332 of the pixel 302 is filtered based on the set of weights (W1-W4 and W6-W9) as per the expression (4) to generate a filtered corresponding pixel 332 in the Cr component image 330. In an example embodiment, each corresponding pixel in the Cr component image 330 is filtered in a similar manner as that of the Cb component image 320.

Some example methods for reducing chromatic aberrations in image convolutions are described with reference to FIGS. 4, 5 and 6.

Figure 4:
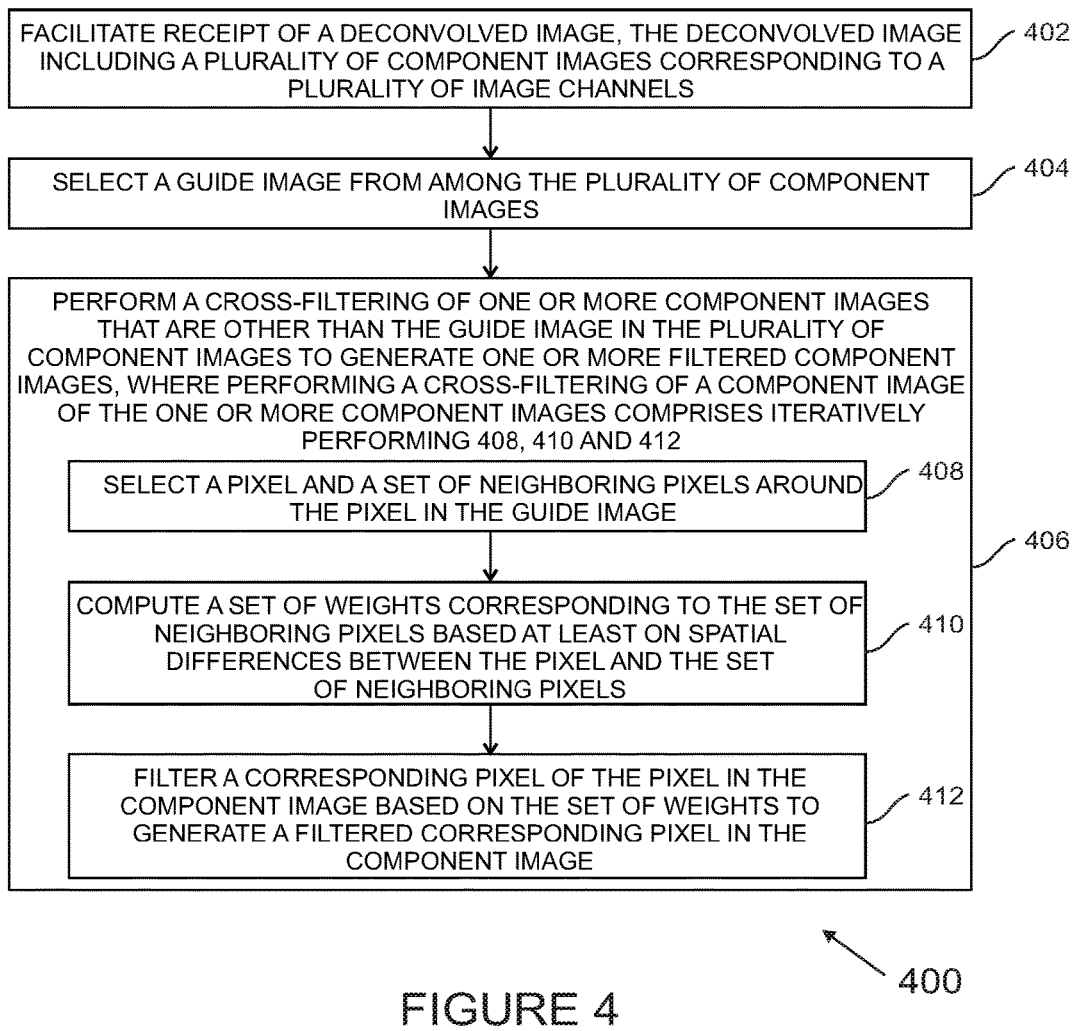
FIG. 4 is a flowchart depicting an example method for reducing chromatic aberrations in deconvolved images, in accordance with an example embodiment.

FIG. 4 is a flowchart depicting an example method 400 for reducing chromatic aberrations in deconvolved images, in accordance with an example embodiment. The method 400 is shown and explained with reference to FIG. 2. The method 400 depicted in the flowchart may be executed by, for example, the apparatus 200 of FIG. 2.

At 402, the method 400 includes facilitating receipt of a deconvolved image. The deconvolved image includes a plurality of component images corresponding to a plurality of image channels. In an example embodiment, the deconvolved image may be generated by performing image deconvolution on an image, for example a blurred image. The image deconvolution is performed in order to remove blur from the image. In an example embodiment, the plurality of component images includes luminance image (Y), chrominance blue image (Cb), and chrominance red image (Cr). Alternatively, the plurality of component images may be component images other than Y, Cb, Cr component images.

At 404, the method 400 includes selecting a guide image from among the plurality of component images. In an example embodiment, the Y component image is selected as the guide image, as described with reference to FIGS. 2 and 3.

At 406, the method 400 includes performing a cross-filtering of one or more component images that are other than the guide image in the plurality of component images to generate one or more filtered component images.

In an example embodiment, the cross-filtering is performed for a component image of the one or more component images by iteratively performing operations of the blocks 408-412. In an example embodiment, the cross-filtering may be performed by a bilateral filtering method or a minimum spanning tree method. The cross-filtering performed using the bilateral filtering method is explained in detail with reference to FIG. 5 and the cross-filtering performed using the minimum spanning tree method is explained in detail with reference to FIG. 6. For instance, at 408, the method 400 includes selecting a pixel and a set of neighboring pixels around the selected pixel in the guide image. For example, a center pixel and immediate neighboring pixels around the center pixel may be selected in the guide image, for example the Y component image. In an example embodiment, the selected pixel and the set of neighboring pixels represent a window of pixels of size W (width)×W (height).

At 410, the method 400 includes computing a set of weights corresponding to the set of neighboring pixels based at least on spatial differences between the selected pixel and the set of neighboring pixels. In an example embodiment, for the bilateral filtering method, the set of weights correspond to bilateral weights computed based on a set of spatial differences as well as a set of pixel differences between the set of neighboring pixels and the selected pixel. In an example embodiment, the bilateral weights are calculated based on the expressions (1), (2) and (3). In an example embodiment, for the minimum spanning tree method, the set of weights correspond to minimum spanning tree distances (the set of spatial differences) between the set of neighboring pixels and the pixel. In an example embodiment, the minimum spanning tree weights are calculated based on the expression (5).

At 412, the method 400 includes filtering a corresponding pixel of the selected pixel in the component image based on the set of weights to generate a filtered corresponding pixel in the component image. On calculating the set of weights of neighboring pixels in the guide image, for example the Y component image, a corresponding neighboring pixel (of a component image) of the selected pixel (of the guide image) is filtered based on the set of weights. In an example embodiment, for the bilateral filtering method, the filtered corresponding pixel of the selected pixel may be generated based on the expression (4). In an example embodiment, for the minimum spanning tree method, the filtered corresponding pixel (in the component image) of the selected pixel (in the guide image) may be generated based on the expression (6).

In an example embodiment, the operations of the blocks 408, 410 and 412 are performed for each pixel of the guide image (for example, by selecting each pixel), and the corresponding pixel in the component image is filtered. Similarly, these operations are performed for all component images to perform filtering of pixels of all component images using the guide image.

An example embodiment of reducing chromatic aberrations in deconvolved images using bilateral filtering method is further explained with reference to FIG. 5.

Figure 5:
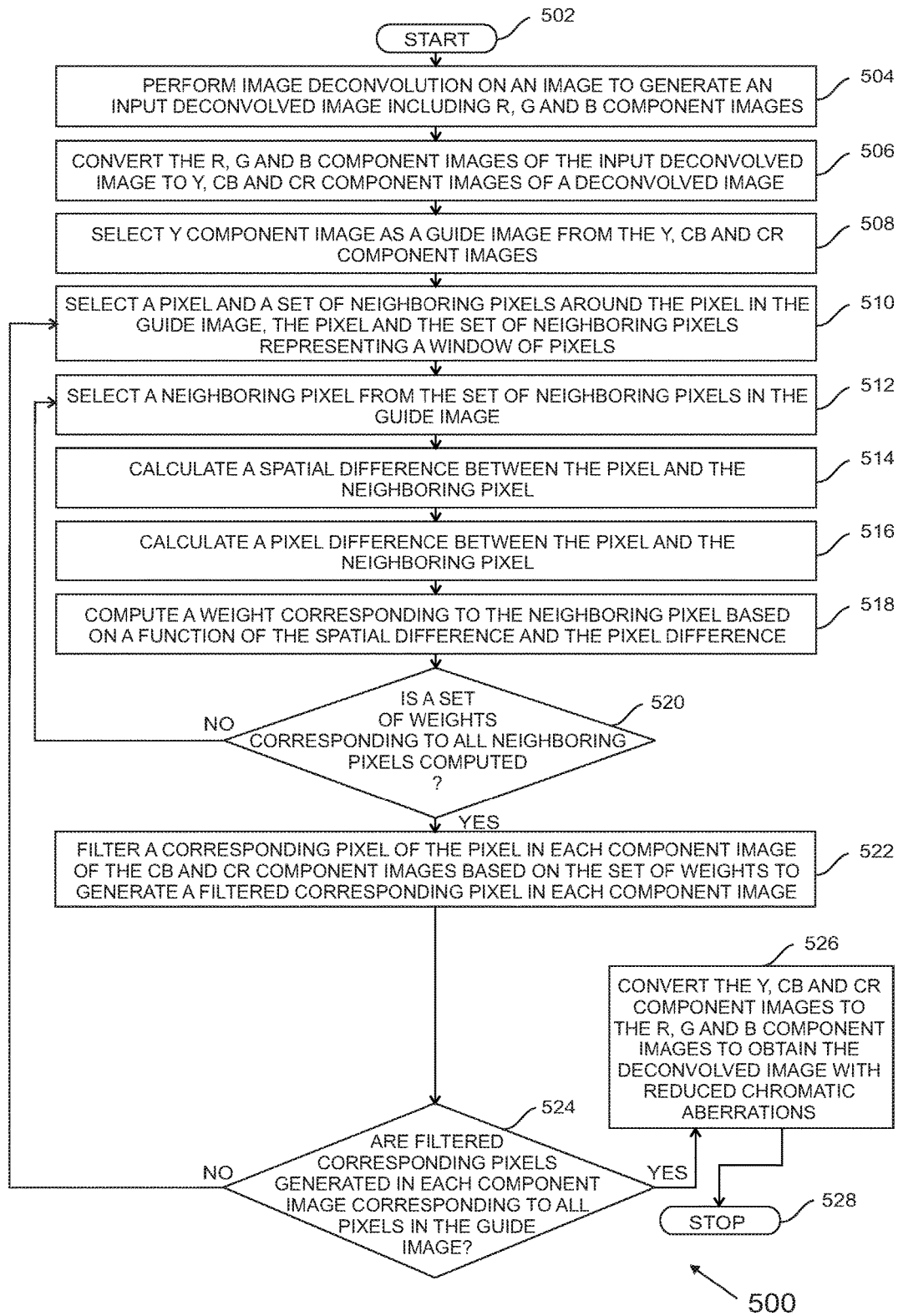
FIG. 5 is a flowchart depicting an example method for reducing chromatic aberrations in deconvolved images, in accordance with another example embodiment.

FIG. 5 is a flowchart depicting an example method 500 for reducing chromatic aberrations in deconvolved images, in accordance with another example embodiment. The method 500 is shown and explained with reference to FIG. 2. The method 500 depicted in the flowchart may be executed by, for example, the apparatus 200 of FIG. 2. The method 500 starts at 502.

At 504, the method 500 includes performing image deconvolution on an image to generate an input deconvolved image including R, G and B component images. In an example embodiment, the image may be a blurred image and the image deconvolution is performed to remove blur from the image. At 506, the method 500 includes converting the R, G and B component images of the input deconvolved image to Y, Cb, and Cr component images of a deconvolved image. In an example embodiment, the following operations may also be performed on the R, G and B component images without converting it to the Y, Cb and Cr component images.

At 508, the method 500 includes selecting Y component image as a guide image from the Y, Cb and Cr component images. Without limiting to the scope of the various example embodiments of the present disclosure, it should be noted that Y component image is chosen as the guide image as the human eye is more sensitive to edges in luminance channel (i.e., the Y component image) compared to the chrominance channel (i.e., the U and V component images). Hence, by taking Y component image as a guide image, the edges of Y component image are retained and the edges in other component images (i.e., chrominance channels) are changed as per the edges in the luminance channel. At 510, the method 500 includes selecting a pixel and a set of neighboring pixels around the pixel in the guide image, where the pixel and the set of neighboring pixels represent a window of pixels. For instance, as depicted in FIG. 3, a pixel P5 is selected as the pixel in the Y component image 300 and pixels P1, P2, P3, P4, P6, P7, P8 and P9 are selected as the set of neighboring pixels of the pixel P5. In an example embodiment, if the pixel is a corner pixel, the set of neighboring pixels are few and only such neighboring pixels are considered for the cross-filtering.

At 512, the method 500 includes selecting a neighboring pixel from the set of neighboring pixels in the guide image. For example, a neighboring pixel P1 is selected from the set of neighboring pixels in the Y component image.

At 514, the method 500 includes calculating a spatial difference between the selected pixel and the neighboring pixel. In an example, the spatial difference may be calculated between the neighboring pixel P1 and the pixel P5 using the expression (1).

At 516, the method 500 includes calculating a pixel difference between the selected pixel and the neighboring pixel. In an example, the pixel difference may be calculated between the neighboring pixel P1 and the pixel P5 using the expression (2). It should be noted that the spatial different and the pixel difference may be calculated in any order, or in simultaneous manner.

At 518, the method 500 includes computing a weight for the neighboring pixel based on a function of the spatial difference and the pixel difference. For instance, the weight for the neighboring pixel P1 may be computed based on the spatial difference determined at block 514, the pixel difference calculated at block 516, using the expression (3).

At 520, the method 500 includes checking if a set of weights corresponding to all neighboring pixels of the selected pixel is computed. If the set of weights corresponding to all neighboring pixels is not computed, the method 500 goes to block 512 else 522 is performed. For example, once the weight for the neighboring pixel P1 is computed, the processor 202 checks if weights for all the neighboring pixels of the pixel P5 are computed. In this case, as only the weight for the neighboring pixel P1 is computed, the operations at blocks 512 to 520 is repeated until weights for all the neighboring pixels (P1, P2, P3, P4, P6, P7, P8 and P9) of the pixel P5 is computed.

At 522, the method 500 includes filtering a corresponding pixel of the selected pixel in each component image of the Cb and Cr component images based on the set of weights to generate a filtered corresponding pixel in the each component image. Once the set of weights are computed for the set of neighboring pixels (P1, P2, P3, P4, P6, P7, P8 and P9), each weight is multiplied with a pixel value of a corresponding neighboring pixel of a corresponding pixel of the selected pixel in a component image. The corresponding pixel is thus filtered based on a function on resulting values to generate the filtered corresponding pixel (for example P'5 or P"5 as depicted in FIG. 3) of the pixel P5, as per the expression (4).

At 524, the method 500 includes checking if filtered corresponding pixels are generated in the component images Cb and Cr corresponding to all pixels in the guide image. If the filtered corresponding pixels are not generated corresponding to all pixels in the guide image, the method 500 goes to block 510 to select another pixel and another set of neighboring pixels and performs other operations at blocks 510 to 522, else 526 is performed. For example, once the filtered corresponding pixel (P'3 and P"5) for the pixel P5 is generated, the processor 202 checks if the filtered corresponding pixels are generated for all pixels in the Y component image. In this case, as only the filtered corresponding pixel for the pixel P5 is generated, the operations at blocks 510 to 522 is repeated by taking different window of pixels until all filtered corresponding pixels of the component images are generated. At 526, the method 500 includes converting the YCbCr component images to the RGB component images to obtain the deconvolved image (a filtered deconvolved image) with reduced chromatic aberrations. The method stops at 528.

An example embodiment of reducing chromatic aberrations in deconvolved images using minimum spanning tree method is further explained with reference to FIG. 6.

Figure 6:
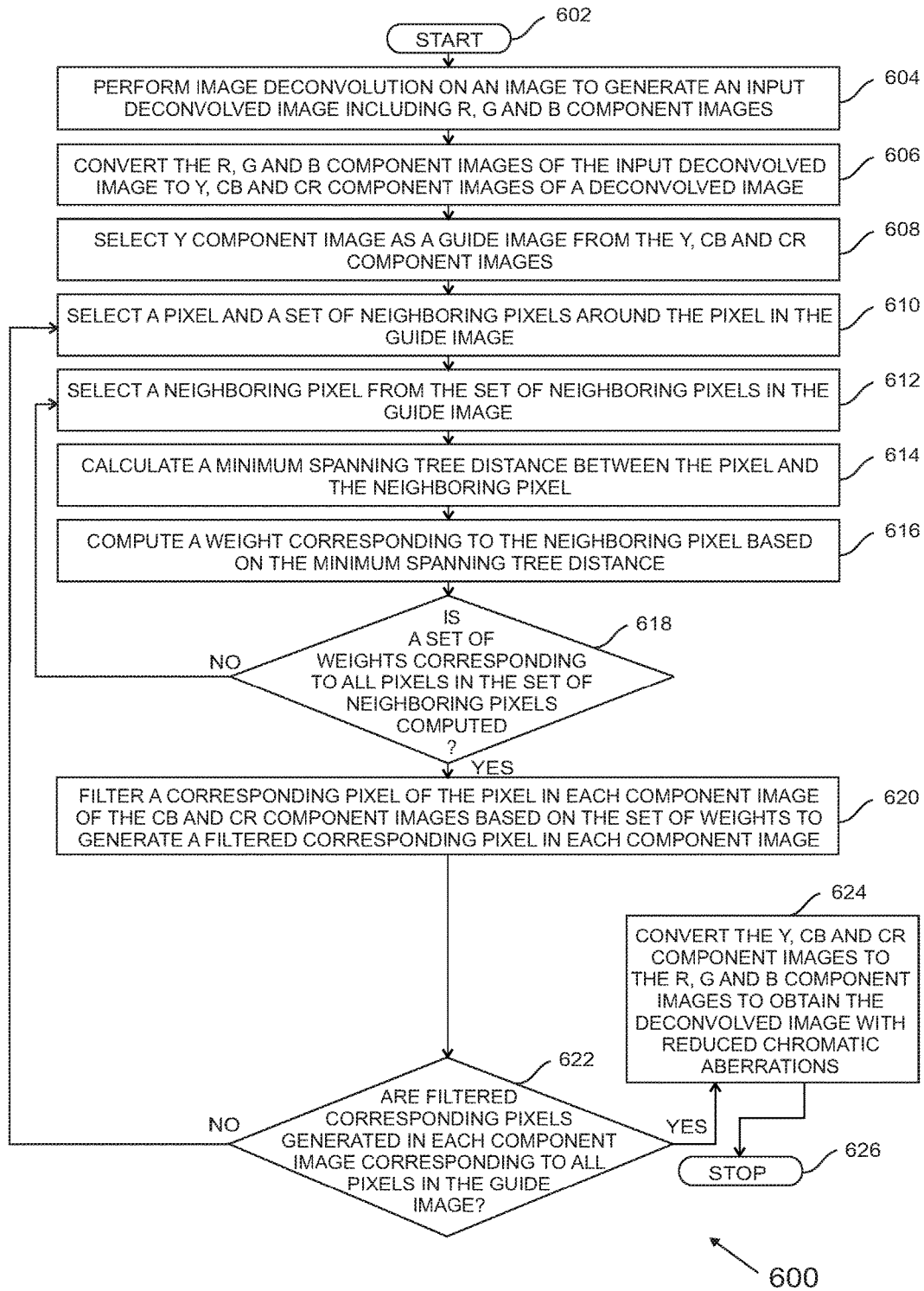
FIG. 6 is a flowchart depicting an example method for reducing chromatic aberrations in deconvolved images, in accordance with yet another example embodiment.

FIG. 6 is a flowchart depicting an example method 600 for reducing chromatic aberrations in deconvolved images, in accordance with yet another example embodiment. The method 600 is shown and explained with reference to FIG. 2. The method 600 depicted in the flowchart may be executed by, for example, the apparatus 200 of FIG. 2. The method 600 starts at 602.

At 604, the method 600 includes performing image deconvolution on an image to generate an input deconvolved image including R, G and B component images. In an example embodiment, the image may be a blurred image and the image deconvolution is performed to remove blur from the image. At 606, the method 600 includes converting the R, G, and B component images of the input deconvolved image to Y, Cb, and Cr component images of a deconvolved image. In an example embodiment, the following operations may also be performed without converting the R, G, and B component images to the Y, Cb and Cr component images.

At 608, the method 600 includes selecting Y component image as a guide image from the Y, Cb and Cr component images. At 610, the method 600 includes selecting a pixel and a set of neighboring pixels around the selected pixel in the guide image. In this example embodiment, the set of neighboring pixels may include all or some of the pixels of the guide image. As such the set of neighboring pixels are not restricted by any spatial distance from the selected pixel.

At 612, the method 600 includes selecting a neighboring pixel from the set of neighboring pixels in the guide image. For example, a neighboring pixel P1 is selected from the set of neighboring pixels in the Y component image.

At 614, the method 600 includes calculating a minimum spanning tree distance between the selected pixel and the neighboring pixel. At 616, the method 600 includes computing a weight, for example a minimum spanning tree weight, corresponding to the neighboring pixel based on the minimum spanning tree distance. For instance, the minimum spanning tree weight for the neighboring pixel P1 may be computed based on the minimum spanning tree distance determined at block 614, using the expression (5).

At 618, the method 600 includes checking if a set of weights corresponding to all neighboring pixels of the selected pixel is computed. If the set of weights corresponding to all neighboring pixels is not computed, the method 600 goes to block 612 else 620 is performed. For example, the operations at blocks 612 to 618 is repeated until weights for all the neighboring pixels of the selected pixel is computed.

At 620, the method 600 includes filtering a corresponding pixel of the selected pixel in each component image of the Cb and Cr component images based on the set of weights to generate a filtered corresponding pixel in the each component image. Once the set of weights are computed for the set of neighboring pixels in the guide image (Y component image), each weight is multiplied with a pixel value of a corresponding neighboring pixel of a corresponding pixel of the selected pixel in a component image. The corresponding pixel is thus filtered based on a function of resulting values to generate the filtered corresponding pixel, as per the expression (6) of the minimum spanning tree method.

At 622, the method 600 includes checking if filtered corresponding pixels are generated in the component images Cb and Cr corresponding to all pixels in the guide image. If the filtered corresponding pixels are not generated corresponding to all pixels in the guide image, the method 600 goes to block 610 to select another pixel and another set of neighboring pixels and performs other operations at blocks 610 to 620, else 624 is performed. At 624, the method 600 includes converting the YCbCr component images to the RGB component images to obtain the deconvolved image (a filtered deconvolved image) with reduced chromatic aberrations. The method stops at 626.

Figure 7:
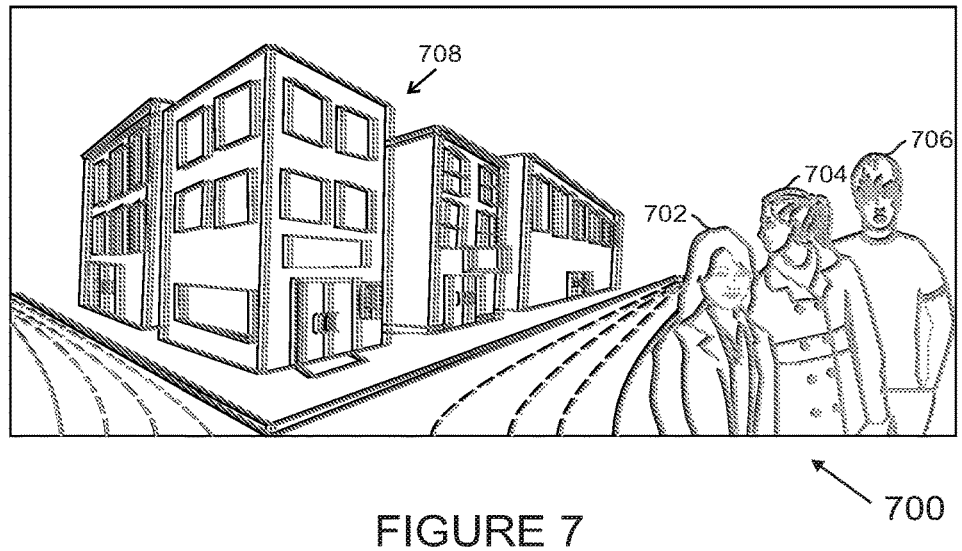
FIG. 7 illustrates an example representation of a blurred image, in accordance with an example embodiment.

FIG. 7 illustrates an example representation of a blurred image 700 of a scene, in accordance with an example embodiment. In this example representation, the blurred image 700 may be captured by an image sensor, for example the image sensor 208 embodied in camera, in the apparatus 200. In an example, the blurred image 700 may be generated as a consequence of a user handshake when clicking the scene with the apparatus 200, or due to any other phenomenon. In another example, the blurred image 700 may be generated as a consequence of improper focus. The blurred image 700 includes objects in a foreground and a background of the scene 700, respectively. For example, the foreground includes a lady 702, a lady 704, and a man 706, and the background includes a building 708 and roads. As illustrated in FIG. 7, the objects in the foreground and the background of the blurred image 700 are shown as blurred or out-of-focus in the form of example representation.

Figure 8:
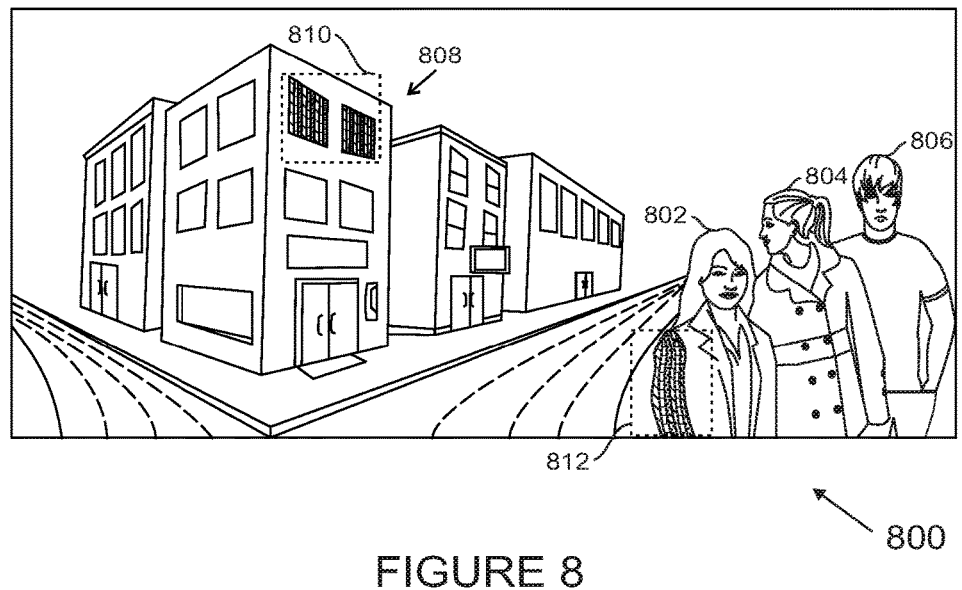
FIG. 8 illustrates an example representation of a deconvolved image with chromatic aberrations, in accordance with an example embodiment.

FIG. 8 illustrates an example representation of a deconvolved image 800, in accordance with an example embodiment. In this example representation, image deconvolution is performed on the blurred image 700 to generate the deconvolved image 800 which is a sharper and in-focus image as compared to the blurred image 700. The image deconvolution may be performed by any technique known in the art, for example by the apparatus 200. Some example methods of the image deconvolution include, but are not limited to a point spread function (PSF) based technique. The deconvolved image 800, as depicted in FIG. 8, includes objects in the foreground and the background, respectively, which are sharper as compared to the objects in the blurred image 700. For example, the foreground includes a lady 802, a lady 804, and a man 806 (sharper or unblurred versions of the lady 702, the lady 704, and the man 706) and the background includes a building 808 and roads (sharper or unblurred versions of the building 708 and the roads in FIG. 7).

However, as illustrated in FIG. 8, the deconvolved image 800 includes chromatic aberrations in different regions of the deconvolved image 800, shown in form of example representation. For example, a region 810 representing a few windows of the building 808 depicts the chromatic aberrations with different representation patterns to indicate varying colors. Similarly, another region 812 representing a hand of the lady 802 depicts the chromatic aberrations with the different representation patterns to indicate the varying colors, for example red, blue, green or a combination of such colors.

Figure 9:
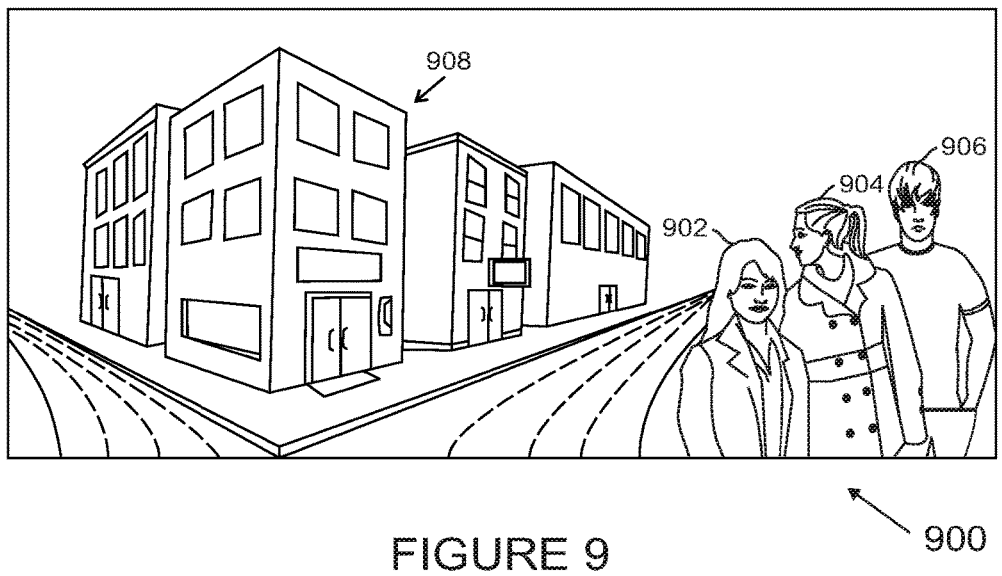
FIG. 9 illustrates an example representation of a filtered deconvolved image with reduced chromatic aberrations, in accordance with an example embodiment.

FIG. 9 illustrates an example representation of a filtered deconvolved image 900 with reduced chromatic aberrations, in accordance with an example embodiment. In this example representation, the chromatic aberrations present in the deconvolved image 800, for example the regions 810 and 812) is reduced using cross-filtering, as described with references to FIGS. 2 and 3, to generate the filtered deconvolved image 900 with reduced chromatic aberrations. In this example representation, there is reduced chromatic aberrations in a lady 902, a lady 904, a man 906, a building 908 and roads (as shown in FIG. 9) as compared to the lady 802, the lady 804, the man 806, and the building 808 as shown and described with reference to FIG. 8. In an example embodiment, the cross-filtering may be performed based on a bilateral filtering method, as explained in detail with reference to FIG. 5, or a minimum spanning tree method, as explained in detail with reference to FIG. 6.

The deconvolved image 800 (an input deconvolved image) may be converted from R, G, B component images to Y, Cb, Cr component images. The Y component image may be selected as a guide image from the Y, Cb and Cr component images. The cross-filtering is then performed on the Cb and Cr component images with respect to the Y component image to generate corresponding filtered component images. For example, the cross-filtering is performed on each component image by iteratively selecting a pixel and a set of neighboring pixels around the selected pixel in the guide image, computing a set of weights corresponding to the set of neighboring pixels based at least on a set of spatial differences and/or a set of pixel differences between the selected pixel and the set of neighboring pixels, and computing a set of weights corresponding to the set of neighboring pixels based at least on the set of spatial differences and/or the set of pixel differences between the selected pixel and the set of neighboring pixels. Such steps for the cross-filtering are explained in detail with reference to FIGS. 2 and 3, and is not explained herein for sake of brevity. Once, the cross-filtering is performed on the component images of the deconvolved image 800, the filtered deconvolved image 900 with reduced chromatic aberrations is obtained. In another technique, the filtering of the component images of the deconvolved image 800 is performed using the minimum spanning tree method, to generate the filtered deconvolved image 900. The filtered deconvolved image 900 with reduced chromatic aberrations including the Y component image and filtered component images of Cb and Cr may be further converted back to the R, G and B component images.

It should be noted that to facilitate discussions of the flowcharts of FIGS. 4, 5, and 6, certain operations are described herein as constituting distinct steps performed in a certain order. Such implementations are examples only and non-limiting in scope. Certain operation may be grouped together and performed in a single operation, and certain operations may be performed in an order that differs from the order employed in the examples set forth herein. Moreover, certain operations of the methods 400, 500, and 600 are performed in an automated fashion. These operations involve substantially no interaction with the user. Other operations of the methods 400, 500, and 600 may be performed by in a manual fashion or semi-automatic fashion. These operations involve interaction with the user via one or more user interface presentations.

The methods depicted in these flowcharts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods may be described and/or practiced by using any other apparatus.

Without in any way limiting the scope, interpretation, or application of the claims appearing below, a technical effect of one or more of the example embodiments disclosed herein is to improve reduce chromatic aberrations in deconvolved images. Various example embodiments provision for performing cross-filtering, using either a bilateral filtering method and/or a minimum spanning tree method, on component images based on a guide image (the guide image and the component images representing a plurality of component images of a deconvolved image) to obtain a deconvolved image with reduced chromatic aberrations. Various example embodiments provision for a post-processing technique to obtain significant reduction in chromatic aberrations in an efficient, fast, and accurate manner, thereby enabling generation of a high-quality deconvolved image.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
    facilitating receipt of a deconvolved image, the deconvolved image comprising a plurality of component images corresponding to a plurality of image channels;
    selecting a guide image from among the plurality of component images; and
    performing a cross-filtering of one or more component images that are other than the guide image in the plurality of component images to generate one or more filtered component images, wherein performing the cross-filtering comprises iteratively performing:
        selecting a pixel and a set of neighboring pixels around the pixel in the guide image;
        computing a set of weights corresponding to the set of neighboring pixels based at least on spatial differences between the pixel and the set of neighboring pixels; and
        filtering a corresponding pixel of the pixel in the component image based on the set of weights to generate a filtered corresponding pixel,
    wherein the one or more filtered component images form a filtered deconvolved image with a reduced chromatic aberration; and wherein the cross-filtering is performed using a minimum spanning tree method.

2. The method as claimed in claim 1, wherein computing the set of weights corresponding to the set of neighboring pixels comprises:
    calculating a set of spatial differences between the pixel and the set of neighboring pixels;
    calculating a set of pixel differences between the pixel and the set of neighboring pixels; and
    computing the set of weights based on functions of the set of spatial differences and the set of pixel differences.

3. The method as claimed in claim 2, wherein the pixel and the set of neighboring pixels represent a window of pixels of size width (W)×height (H).

4. The method as claimed in claim 1, wherein selecting the pixel comprises selecting each pixel of the guide image.

5. The method as claimed in claim 1, wherein the plurality of component images comprise a luminance image (Y), a chrominance blue image (Cb), and a chrominance red image (Cr).

6. The method as claimed in claim 5, wherein facilitating receipt of the deconvolved image comprises:
    converting an input deconvolved image comprising a red image (R), a green image (G), and a blue image (B) as component images to the deconvolved image comprising the Y, Cb, and Cr component images.

7. The method as claimed in claim 1, wherein the plurality of component images comprise a luminance image (Y), a first color difference image (Pb), and a second color difference image (Pr).

8. An apparatus comprising:
at least one processor; and
at least one memory comprising computer program code, the at least one memory and the computer program code configured to, with the at least one processor, cause the apparatus to at least perform:
facilitate receipt of a deconvolved image, the deconvolved image comprising a plurality of component images corresponding to a plurality of image channels;
select a guide image from among the plurality of component images; and
perform a cross-filtering of one or more component images that are other than the guide image in the plurality of component images to generate one or more filtered component images, wherein performing the cross-filtering comprises iteratively performing:
selecting a pixel and a set of neighboring pixels around the pixel in the guide image;
computing a set of weights corresponding to the set of neighboring pixels based at least on spatial differences between the pixel and the set of neighboring pixels; and
filtering a corresponding pixel of the pixel in the component image based on the set of weights to generate a filtered corresponding pixel,
wherein the one or more filtered component images form a filtered deconvolved image with a reduced chromatic aberration; and wherein the cross-filtering is performed using a minimum spanning tree method.

9. The apparatus as claimed in claim 8, wherein for computing the set of weights corresponding to the set of neighboring pixels, the apparatus is further caused, at least in part to:
calculate a set of spatial differences between the pixel and the set of neighboring pixels;
calculate a set of pixel differences between the pixel and the set of neighboring pixels; and
compute the set of weights based on functions of the set of spatial differences and the set of pixel differences.

10. The apparatus as claimed in claim 9, wherein the pixel and the set of neighboring pixels represent a window of pixels of size width (W)×height (H).

11. The apparatus as claimed in claim 8, wherein for selecting the pixel, the apparatus is further caused, at least in part to select each pixel of the guide image.

12. The apparatus as claimed in claim 8, wherein the plurality of component images comprise a luminance image (Y), a chrominance blue image (Cb), and a chrominance red image (Cr).

13. The apparatus as claimed in claim 12, wherein for facilitating receipt of the deconvolved image, the apparatus is further caused, at least in part to:
convert an input deconvolved image comprising a red image (R), a green image (G), and a blue image (B) as component images to the deconvolved image comprising the Y, Cb, and Cr component images.

14. The apparatus as claimed in claim 8, wherein the plurality of component images comprise a luminance image (Y), a first color difference image (Pb), and a second color difference image (Pr).

15. A computer program product comprising at least one computer-readable storage medium, the computer-readable storage medium comprising a set of instructions, which, when executed by one or more processors, cause an apparatus to at least perform:
facilitate receipt of a deconvolved image, the deconvolved image comprising a plurality of component images corresponding to a plurality of image channels;
select a guide image from among the plurality of component images; and
perform a cross-filtering of one or more component images that are other than the guide image in the plurality of component images to generate one or more filtered component images, wherein performing the cross-filtering comprises iteratively performing:
selecting a pixel and a set of neighboring pixels around the pixel in the guide image;
computing a set of weights corresponding to the set of neighboring pixels based at least on spatial differences between the pixel and the set of neighboring pixels; and
filtering a corresponding pixel of the pixel in the component image based on the set of weights to generate a filtered corresponding pixel,
wherein the one or more filtered component images form a filtered deconvolved image with a reduced chromatic aberration; and wherein the cross-filtering is performed using a minimum spanning tree method.

16. The computer program product as claimed in claim 15, wherein for computing the set of weights corresponding to the set of neighboring pixels, the apparatus is further caused, at least in part to:
calculate a set of spatial differences between the pixel and the set of neighboring pixels;
calculate a set of pixel differences between the pixel and the set of neighboring pixels; and
compute the set of weights based on functions of the set of spatial differences and the set of pixel differences.

17. The computer program product as claimed in claim 16, wherein the pixel and the set of neighboring pixels represent a window of pixels of size width (W)×height (H).

18. The computer program product as claimed in claim 15, wherein the plurality of component images comprise a luminance image (Y), a chrominance blue image (Cb), and a chrominance red image (Cr).

* * * * *